United States Patent

Pierce et al.

[11] Patent Number: 6,003,433
[45] Date of Patent: Dec. 21, 1999

[54] TAMPER-RESISTANT BRAKE ACTUATOR

[75] Inventors: William C. Pierce; William J. Hicks, both of Muskegon, Mich.

[73] Assignee: Holland Neway International, Inc., Muskegon, Mich.

[21] Appl. No.: 09/021,530

[22] Filed: Feb. 10, 1998

[51] Int. Cl.[6] ........................................ F16J 3/00
[52] U.S. Cl. ................................ 92/98 R; 92/64
[58] Field of Search .................... 92/96, 98 R, 62, 92/63, 64

[56] References Cited

U.S. PATENT DOCUMENTS

| | | | |
|---|---|---|---|
| 3,824,903 | 7/1974 | Hahn | 92/64 |
| 3,994,206 | 11/1976 | Dahlkvist et al. | |
| 5,062,455 | 11/1991 | Schurter et al. | 92/98 R |
| 5,193,432 | 3/1993 | Smith . | |
| 5,285,716 | 2/1994 | Thompson . | |

FOREIGN PATENT DOCUMENTS 0 315 463 A2  5/1989  European Pat. Off. .

WO 95/12748  5/1995  WIPO .

OTHER PUBLICATIONS

Marks' Standard Handbook for Mechanical Engineers, 9th Ed, New York, McGraw–Hill, 1987, p. 13–33.

*Primary Examiner*—F. Daniel Lopez
*Attorney, Agent, or Firm*—Rader, Fishman & Grauer P.L.L.C.

[57] ABSTRACT

A fluid-operated combination diaphragm spring brake has a tamper-resistant connection between a head and a flange case which together form a spring chamber housing a power spring. The head has an annular flange and an axial rim, and the flange case has an annular flange and an axial rim, The flanges of the head and the flange case and at least one of the rims of the head and the flange case define an annular recess. A diaphragm is sandwiched between the flanges and substantially fills the annular recess, removing substantially all the air within the annular recess. A welded connection radially adjacent the diaphragm secures head rim to the flange case rim.

9 Claims, 2 Drawing Sheets

TAMPER-RESISTANT BRAKE ACTUATOR

BACKGROUND OF THE INVENTION

1. Field of the Invention

This invention relates to diaphragm spring brake actuators of the type used with air brake systems on vehicles such as trucks. In one of its aspects, the invention relates to a spring brake actuator having a tamper-resistant spring chamber.

2. State of the Prior Art

Spring brake actuators are in common use with air brake systems used on trucks, buses, and towed vehicles. Such actuators are typically provided with a service chamber for normally applying and releasing the brakes in response to delivery and exhaust of compressed air, and a spring chamber disposed in tandem with the service chamber for providing parking or emergency brake functions. A spring brake actuator uses spring force to operate a service brake actuator and apply brakes when pressurized air in the spring chamber is reduced below some predetermined level. Air pressure may be reduced in the spring chamber to apply the brakes under the control of the operator or automatically as a result of failure of the pressurized air system. The service chamber and spring chamber are separated by an adapter or flange casing which forms a wall between the two chambers.

In a typical spring brake actuator, a barrel-shaped power spring is used to store energy and to exert the large force required for braking in the event of air pressure failure. Air pressure acting on a diaphragm or a piston is employed to compress the spring and maintain it in its brake release position. When the air is exhausted, the spring acts on the diaphragm, typically an elastomeric diaphragm or a piston, and through an actuating rod exerts the spring force on the service push rod to apply the brakes in the event of a failure of the system air pressure.

The spring brake actuator operates within the spring chamber, which is typically formed by clamping an elastomeric diaphragm between a head (sometimes also known as a spring housing or spring chamber) and the adapter. The power spring is typically compressed within the spring chamber between the head and the diaphragm. The spring has a high spring constant and typically weighs 3 pounds or more, being compressed to a linear length of less than 3 inches from an original uncompressed length in an extended condition of from 9 to 12 inches. With a high spring constant, the spring has a substantial amount of potential energy, exerting a force on the head of from 2,000 to 3,000 pounds.

In previous diaphragm style brake actuators, the brake actuator head is secured to the adapter by means of a band, generally U-shaped in cross section, to clamp mating flanges on the head and adapter with the diaphragm clamped therebetween. Typically the band is formed of sections bolted together for convenient disassembly. Because the power spring is under great pressure, means must be provided to restrain or "cage" the power spring before the spring chamber can be safely disassembled. Failure to properly cage the power spring prior to disassembly and the resulting sudden release of potential energy in the spring can cause the head and adapter to fly apart.

To deter disassembly of the spring chamber, the clamp band has been formed from a continuous ring, deformed over the flanges to form what is commonly termed a sealed brake. Safety is an advantage of a sealed brake. Because it must be deformed to be removed, a sealed brake clamp band or deformed flange deters disassembly of the spring chamber.

The same feature which makes sealed brakes safer also deters future repair, because disassembly is difficult without damaging the brake. If the diaphragm should fail for example, the entire brake actuator may need to be replaced. In any event, reconditioning of a sealed brake is a very difficult procedure.

Other means are used for securing the brake actuator head to the adapter in a tamper-resistant brake. For example, U.S. Pat. No. 5,315,918 to Pierce, issued May 31, 1994, discloses a bayonet mount for securing the brake actuator head to the adapter. The brake actuator head and the adapter have complementary axially-extending lips. One of the lips has a series of openings formed therein and in which is received a plug weld to secure the actuator head to the adapter.

U.S. Pat. No. 5,285,716 to Thompson, issued Feb. 15, 1994, discloses the welding of a brake actuator head to an adapter in such a manner so that the weld securing the brake actuator head to the adapter is a sufficient distance from the diaphragm so as not to burn the diaphragm. Specifically, the brake actuator head has an axially-extending flange that overlaps an axially-extending flange of the adapter and extends a sufficient distance from the diaphragm compressed between the actuator head and the adapter so that the heat from the weld formed at the end of the axially-extending flange of the actuator head will not burn the diaphragm.

SUMMARY OF THE INVENTION

According to the invention, a fluid-operated brake actuator of the type which has a generally cylindrical head and a flange case with an elastomeric diaphragm between the two has a welded connection adjacent to the peripheral portion of the diaphragm. The flange case and the head have radially extending flanges which are shaped to compress the peripheral edge of the diaphragm so that the diaphragm substantially fills an annular recess formed between radially extending flanges on the flange case and the cylindrical head.

In one embodiment, the head and the flange case both have axially extending rims on the outer edges of the flanges. The rims overlap and the weld is made between the rims.

Because the elastomeric gasket substantially completely fills the annular spaces formed between the radially extending flanges between the head and the flange case and closed by annular rims on the flanges, the welds can be placed radially adjacent to the elastomeric diaphragm without deleteriously burning the diaphragm. Thus, the seal remains intact between the head and the flange case. Yet, the connection can be welded to avoid unauthorized tampering. Thus, material content can be decreased, thereby decreasing the cost and weight of the spring brake actuator.

BRIEF DESCRIPTION OF THE DRAWINGS

The invention will now be described with reference to the accompanying drawings in which.

DETAILED DESCRIPTION OF THE DRAWINGS

Figure 1:
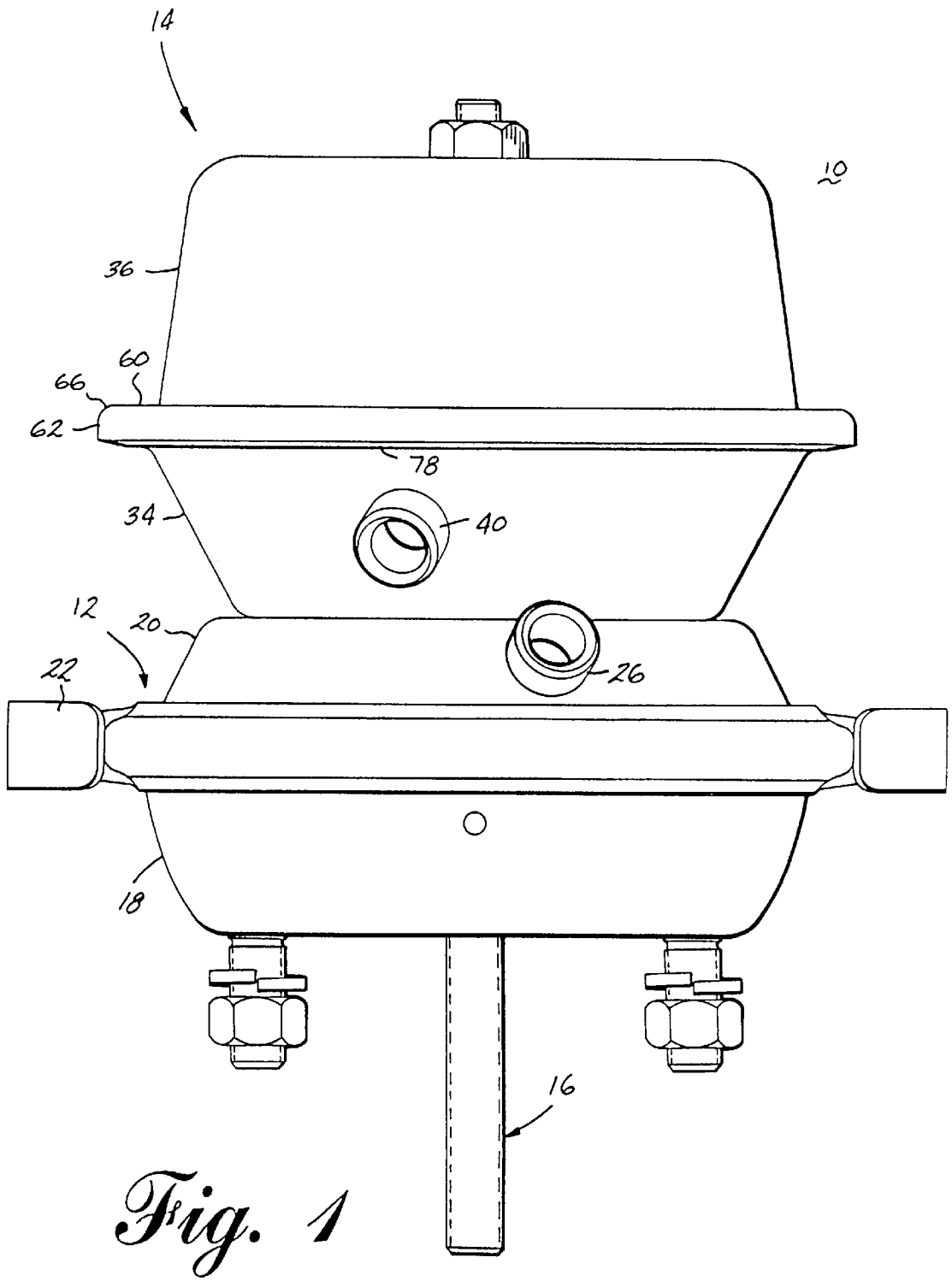
FIG. 1 shows an elevational view of a fluid-operated combination diaphragm spring brake actuator according to the invention.
Figure 2:
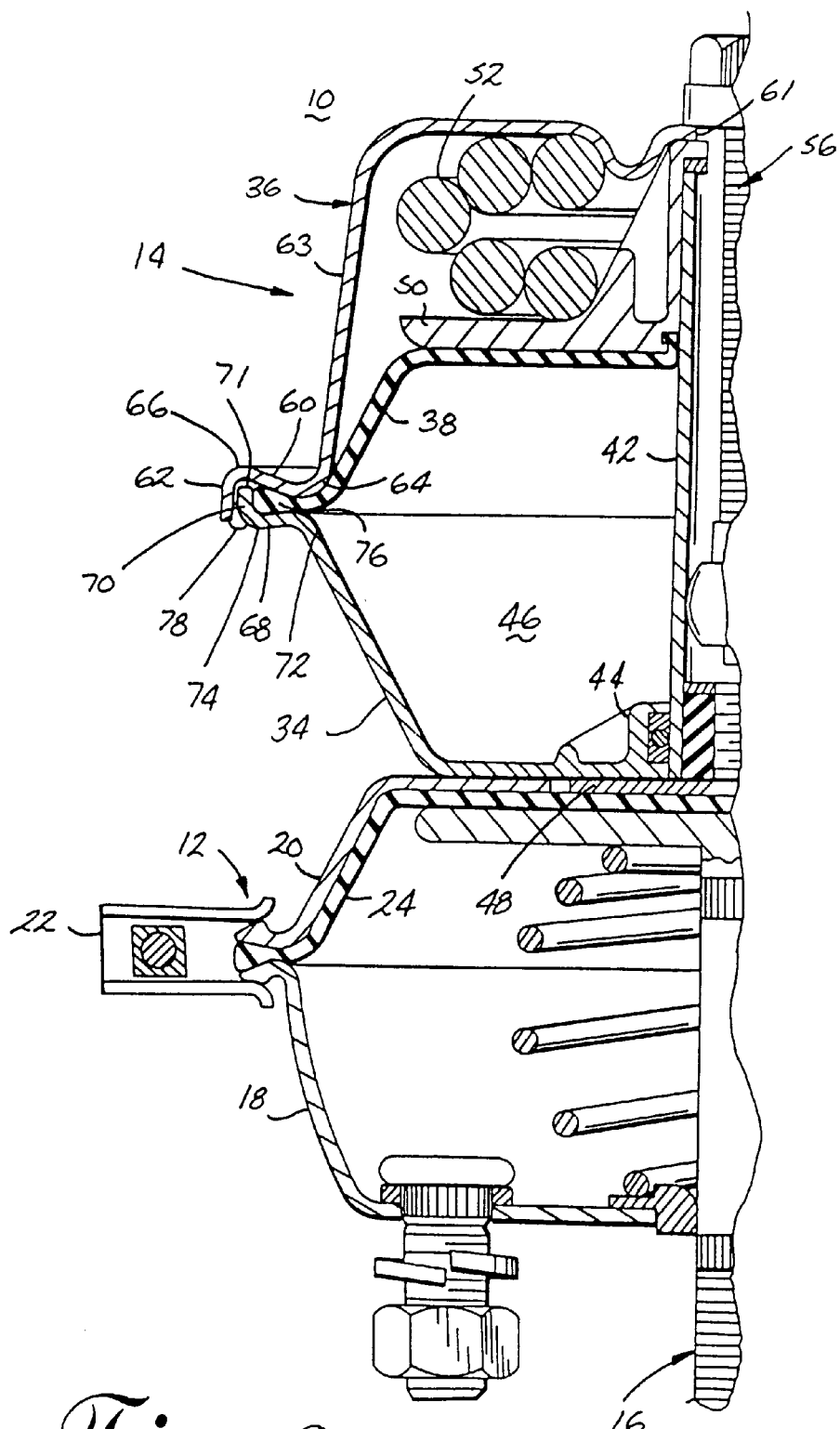
FIG. 2 is a partial sectional view of the fluid-operated combination diaphragm spring brake actuator of FIG. 1.

Referring now to FIGS. 1 and 2, there is shown a fluid-operated brake actuator 10 in accordance with the invention. The particular embodiment shown is a fluid-operated combination diaphragm spring brake actuator having both a service chamber 12 and a spring chamber 14. The brake actuator is adapted to mount to a mounting bracket (not shown) of a vehicle axle and is further adapted to operate a brake (not shown) through a service push rod 16 which typically extends to and connects with a slack adjuster and the braking system of the vehicle.

Although the invention relates to a spring chamber, the service chamber 12 and spring chamber 14 are illustrated joined together in tandem because this arrangement is common in a spring brake actuator. The construction of the service chamber 12 is well known. Therefore, the service chamber 12 will only be described generally. The service chamber 12 is defined by a cup-shaped lower service housing 18 and a cup-shaped upper service housing 20 joined together by a clamp 22 to form a hollow interior chamber. A first elastomeric diaphragm 24 (also known as the service brake diaphragm) is compressed in fluid-tight engagement between the lower service housing 18 and the upper service housing 20. A service chamber air port 26 is connected to a source of pressure to pressurize the upper service housing 20 and to an exhaust valve (not shown) to reciprocally actuate the service push rod 16 upon the addition and exhaustion of air.

The spring chamber 14 is defined by a flange case 34 and a generally cylindrical head 36, also known as a spring chamber, which is secured to the flange case 34. It is the securing of the head 36 to the flange case 34 that is the improvement which forms the subject matter of the invention as will be shown. A second elastomeric diaphragm 38, known as the spring diaphragm, is clamped in fluid-tight engagement between the flange case 34 and the head 36 to form a pressure chamber 46 between the spring diaphragm 38 and flange case 34.

A spring air port 40 extends from the flange case 34 to connect the pressure chamber 46 with a source of pressurized air (not shown). Pressurized air is directed into the pressure chamber 46 between the diaphragm 38 and the flange case 34.

A spring push rod 42 extends through the flange case 34 and upper service housing 20 through a seal 44 so that one end of the spring push rod 42 is within the spring chamber 14 and the other end is within the service chamber 12. The spring push rod 42 has a reaction plate 48 rigidly mounted to the end in the service chamber 12, and a pressure plate 50 is mounted to the other end in the spring chamber 14. The pressure plate 50 bears against the diaphragm 38. A power spring 52 is positioned between the pressure plate 50 and the head 36 to bias the pressure plate 50 and the spring push rod 42 against the force of the pressurized air in the pressure chamber 46. When pressurized air is forced into the pressure chamber 46, it overcomes the force of the power spring 52 to retract the spring push rod 42 and release the brake. When the pressurized air is exhausted, the power spring 52 moves the spring push rod 42 to actuate the brake.

As illustrated, the service chamber 12 is mounted to the spring chamber 14 by welding the upper service housing 20 to the flange case 34. However, it is common for the upper service housing 20 and flange case 34 to be made as a single piece, which is often referred to as an adapter housing. It is within the scope of the invention for the fluid-operated brake actuator 10 to incorporate a one-piece adapter housing.

A release tool 56 can be provided within a central opening 61 of the head 36 for mechanically drawing the pressure plate 50 into a retracted or "caged" position in the event there is a need to mechanically release the brake.

The release tool typically comprises a threaded rod having an integral head on the bottom end thereof and a nut swaged on the top thereof. A second nut is threaded onto the rod and is welded to the head 36. The head on the nut is selectively engageable with portions of the pressure plate 50 in a manner well known in the spring brake actuator field to retract the pressure plate as the rod is unthreaded from the head.

Looking now more closely at the connection securing the flange case 34 to the cylindrical head 36, the cylindrical head 36 has a circumferential, outwardly extending radial flange 60 from which extends a circumferential axial flange 62. Preferably, the radial flange 60 has a slight upward cant in a radial direction or, in other words, forms an upwardly extending acute angle with respect to a plane that is orthogonal to the longitudinal axis of the spring push rod 42. The axial flange 62 extends axially toward the service chamber 12 and is substantially parallel to the longitudinal axis of the spring push rod. Preferably, the radial flange 60 and axial flange 62 are formed by stamping the head 36. A radius transition at 64 is formed between the side wall 63 of the head 36 and radial flange 60 and a radius transition at 66 is formed between radial flange 60 and axial flange 62.

In a similar manner, the flange case 34 also has a circumferential, outwardly-extending radial flange 68 from which extends a circumferential axial flange 70, which terminates in a terminal edge 71. Preferably, the radial flange 68 forms a downwardly extending acute angle with respect to a plane orthogonal to the longitudinal axis of the spring push rod 42. The radial flange 68 and axial flange 70 are also created by bending the flange case 34, forming shoulders 72 and 74. The radial flange 68 extends a radial distance less than the radial flange 60 of the head 36. The difference in the radial extension of the two radial flanges 68, 60 is approximately equal to the thickness of the axial flange 62 to permit the axial flange 70 to nest within the axial flange 62.

During assembly of the brake actuator 10, the spring diaphragm 38 has an annular bead which is disposed between the radial flanges 60 and 68 and compressed therebetween, preferably by applying a compressive force between the radial flanges 60 and 68. An annular recess 76 is formed by the radial flanges 60, 68 and axial flanges 62, 70. The bead on the spring diaphragm 38 has a shape approximating the annular recess 76. The radial flanges 60 and 68 are in alignment and compress the spring diaphragm 38 therebetween to assure essentially complete filling of the the annular recess 76 by the bead of the spring diaphragm 38. As the spring diaphragm 38 is compressed between the radial flanges 60 and 68, a portion of the spring diaphragm 38 is directed into and completely fills the annular recess. The axial flange 70 can be of a predetermined length so that the terminal edge 71 of the axial flange 70 abuts the radial flange 60 when the spring diaphragm 38 is fully compressed. The axial flange 62 is welded to the axial flange 70 along weld 78. The axial flange 70 is positioned between the weld 78 and the edge of the diaphragm 38. The weld 78 is preferably a weld wherein the axial flange 62 is fused to the axial flange 70 without the addition of weld material and minimizes the heat affected zone. Additionally, with specific processes, a heat sink may be necessary to remove excess heat.

Although the spring diaphragm 38 may be singed by the heat, the singeing is not sufficient to degrade the performance of the spring diaphragm 38 as would occur if the spring diaphragm 38 were burnt during the welding process.

By placing the weld 78 adjacent to the diaphragm 38, less material is required to manufacture the head 36 and flange case 34. It is not necessary to extend the edge of the axial flange 62 beyond the diaphragm 38 to prevent the heat from the weld at the edge of the flange from burning the diaphragm, as in previous brake actuators.

In operation, air pressure is continually supplied to the spring chamber 14 through the spring air port 40 to maintain the spring diaphragm 38 in a position to compress the power spring 52. In this position, the service push rod 16 normally will be operated, as described above, by selective pressurization of air into the service chamber 12 through the service air port 26. However, in the event of a loss of pressure, either intentionally, as when the parking brake is set, or by failure of the air pressure system, the pressure in the spring chamber 14 will be decreased and the power spring 52 will activate the brakes by pushing the pressure plate 50, spring diaphragm 38, and thus the spring push rod 42 to thereby actuate the service push rod 16 to apply braking pressure to the brakes.

Reasonable variation and modification are possible within the scope of the foregoing disclosure without departing from the spirit of the invention which is defined in the accompanying claims.

The embodiments of the invention in which an exclusive property or privilege is claimed are as follows:

1. In a fluid-operated brake actuator comprising:
 a generally cylindrical head having at one end a radially extending first flange and a circumferential first rim extending from the first flange;
 a flange case having an upstanding wall with a radially extending second flange at an upper portion thereof and a circumferential second rim extending axially from the second flange, the second rim being in abutting relationship with the first rim and having a welded connection therebetween;
 an annular recess defined by the first flange, second flange, and at least one of the first rim and second rim; and
 an elastomeric diaphragm having a circumferential peripheral edge held in compression between the first flange and the second flange by the welded connection; the improvement wherein:
  the welded connection comprises a weldment between the second rim and the first rim disposed radially from the edge of the elastomeric diaphragm with one of the first and second rims interposed between the weldment and the edge of the diaphragm and wherein the elastomeric diaphragm substantially fills the annular recess, whereby burning of the elastomeric diaphragm during welding of the second rim to the first rim is minimized.

2. A fluid-operated brake actuator according to claim 1 wherein the first and second rims are in overlapping relationship.

3. A fluid-operated brake actuator according to claim 2 wherein at least one of the first and second rims terminates in a rim edge, and the rim edge terminates at a point adjacent the flange associated with the other of the first and second rims.

4. A fluid-operated brake actuator according to claim 1 wherein the diameter of one of the first and second rims is less than the diameter of the other of the first and second rims whereby the one of the rims is adapted to be nested within the other of the rims in overlapping relationship.

5. A fluid-operated brake actuator according to claim 4 wherein at least one of the first and second rims terminates in an edge, and the edge terminates at a point adjacent the flange associated with the other of the first and second rims.

6. A fluid-operated brake actuator according to claim 1 wherein the welded connection is a spot weld.

7. A fluid-operated brake actuator according to claim 1 wherein the welded connection extends around at least a portion of the circumferential first rim.

8. In a fluid-operated brake actuator comprising:
 a generally cylindrical head having at one end a radially extending first flange;
 a flange case having an upstanding wall with a radially extending second flange at an upper end thereof;
 an elastomeric diaphragm positioned between the first and second flanges and compressed into an annular recess defined in part by the first and second flanges; and
 an annular closure member closing the annular recess formed by the first and second flanges, the improvement wherein:
  a circumferential portion of the elastomeric diaphragm substantially completely fills the annular recess and a weld is provided in the closure member to secure the first and second flanges in tight clamped relationship whereby the head is secured to the flange case, the weld being positioned radially outwardly of the annular recess and adjacent to at least a portion of the circumferential portion of the elastomeric diaphragm and wherein the closure member includes a portion interposed between the weld and the edge of the diaphragm.

9. In a fluid-operated brake actuator comprising:
 an upper spring chamber that is generally cylindrical, having a closed upper end and an open lower end, the lower end having a first flange which extends radially outwardly, and slightly upwardly, so as to form an acute angle with a plane which is normal to the longitudinal axis of the spring chamber, the first flange ending in a first rim which extends axially downwardly, forming a cylinder which is concentric with the chamber;
 a lower case in the form of a bowl having an upper edge, the edge terminating in an outwardly extending second flange, the second flange terminating in a vertically oriented second rim, one of the first and second rims adapted to be received in a parallel nesting within the other of the first and second rims;
 an elastomeric diaphragm having a peripheral edge bead adapted to be received in an annular recess formed by the first and second flanges, and the one of the first and second rims;
 the improvement comprising:
  the first and second flanges, the first and second rims, and the peripheral edge bead being configured so that the peripheral edge bead substantially fills the annular recess under compression, and the first and second rims are welded radially adjacent the annular recess with one of the first and second rims interposed between the weldment and the edge of the diaphragm whereby burning of the elastomeric diaphragm during welding is minimized.

* * * * *